US012617035B2

(12) United States Patent
Hu et al.

(10) Patent No.: US 12,617,035 B2
(45) Date of Patent: May 5, 2026

(54) WELDING DETECTION APPARATUS AND WELDING DETECTION METHOD

(71) Applicant: CONTEMPORARY AMPEREX TECHNOLOGY CO., LIMITED, Ningde (CN)

(72) Inventors: Liangjin Hu, Ningde (CN); Lin Ma, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/209,519

(22) Filed: May 15, 2025

(65) Prior Publication Data

US 2025/0326046 A1     Oct. 23, 2025

Related U.S. Application Data

(63) Continuation of application No. PCT/CN2024/084067, filed on Mar. 27, 2024.

(30) Foreign Application Priority Data

Jan. 25, 2024     (CN) .......................... 202410106550.5

(51) Int. Cl.
 *B23K 9/095*     (2006.01)
 *B23K 31/12*     (2006.01)
(52) U.S. Cl.
 CPC .......... *B23K 9/0956* (2013.01); *B23K 31/125* (2013.01)
(58) Field of Classification Search
 CPC ..... B23K 9/095; B23K 9/0956; B23K 31/125

(Continued)

(56) References Cited

U.S. PATENT DOCUMENTS

2023/0139733 A1* 5/2023 Mo ...................... G01N 33/207
                                                        702/166

FOREIGN PATENT DOCUMENTS

CN     109001224 A  * 12/2018  ............. G01N 21/95
CN     109239081 A    1/2019
(Continued)

OTHER PUBLICATIONS

The World Intellectual Property Organization (WIPO) International Search Report and Written Opinion for PCT/CN2024/084067 Oct. 23, 2024 18 Pages (including translation).

(Continued)

*Primary Examiner* — Elizabeth M Kerr
*Assistant Examiner* — Alba T Rosario-Aponte
(74) *Attorney, Agent, or Firm* — ANOVA LAW GROUP, PLLC

(57)     ABSTRACT

A welding detection apparatus is used for detecting a weld seam between a case and a top cover of a battery, and includes: an image acquisition component configured to shoot the weld seam, the image acquisition component being located obliquely above an outer side of the weld seam and forming an included angle with a height direction of the battery; and a controller configured to obtain a protruding height of the weld seam relative to a reference surface area on an outer side wall of the case according to a first distance between the image acquisition component and the outer side wall of the case, a second distance between the image acquisition component and the weld seam, and the included angle, and compare the protruding height with a preset height threshold to determine whether the protruding height of the weld seam is qualified.

15 Claims, 7 Drawing Sheets

(58) Field of Classification Search
USPC ..................................................... 219/130.01
See application file for complete search history.

(56) References Cited

FOREIGN PATENT DOCUMENTS

| | | | | | | |
|---|---|---|---|---|---|---|
| CN | 112067623 | A | * | 12/2020 | ......... | G01N 21/8806 |
| CN | 215177527 | U | | 12/2021 | | |
| CN | 114088738 | A | | 2/2022 | | |
| CN | 114252449 | A | | 3/2022 | | |
| CN | 115147370 | A | | 10/2022 | | |
| CN | 115601359 | A | | 1/2023 | | |
| CN | 117218057 | A | | 12/2023 | | |
| CN | 117252883 | A | * | 12/2023 | ........... | G06T 7/0004 |
| CN | 117630021 | A | | 3/2024 | | |
| JP | 2019058942 | A | | 4/2019 | | |
| KR | 20230160502 | A | | 11/2023 | | |

OTHER PUBLICATIONS

State Intellectual Property Office of China Notice of Grant of Utility Model Patent for Application No. 202410106550.5 Mar. 4, 2024 8 pages (including translation).

Yang Ningxiang et al., The Application of Artificial Intelligence in the Surface Morphology Detection of Weld Seams in Pressure Vessels, Guangdong Special Equipment Testing Institute Zhuhai Testing Institute. Mar. 31, 2021, Issue 3 p. 10-12, 29.

Kustro et al., The Detectability of Welding Defects in MIAB Welded Thin-Walled Tubular Components by Immersion Ultrasonic Technique, A Journal of Nondestructive Evaluation, vol. 39, No. 2, Dec. 31, 2020.

* cited by examiner

1

WELDING DETECTION APPARATUS AND WELDING DETECTION METHOD

CROSS-REFERENCE TO RELATED APPLICATIONS

The present application is a continuation of International Application No. PCT/CN2024/084067, filed on Mar. 27, 2024, which claims priority to Chinese Patent Application No. 202410106550.5, filed with the China National Intellectual Property Administration on Jan. 25, 2024 and entitled "WELDING DETECTION APPARATUS AND WELDING DETECTION METHOD", which are incorporated herein by reference in their entirety.

TECHNICAL FIELD

The present application relates to the technical field of battery assembly detection, and in particular to a welding detection apparatus and a welding detection method.

BACKGROUND

The statement here merely provides background information related to the present application and does not necessarily constitute the related art. In recent years, new energy vehicles have made a leap forward in development. In the field of electric vehicles, power batteries play an irreplaceable role as the power source of electric vehicles. With the vigorous promotion of new energy vehicles, the demand for power battery products is also increasing day by day. As the core component of new energy vehicles, batteries have high requirements on use reliability.

The connection between the top cover and the case of the battery is achieved through welding. If various defects occur in the weld seam, it will pose a great safety risk to the battery. At present, the production line detects the weld seam through manual visual inspection and manual touch, resulting in low accuracy in determining the defect in the weld seam.

SUMMARY

The purpose of the present application is to improve the accuracy of detecting the weld seam on the top cover of the battery.

According to a first aspect, the present application provides a welding detection apparatus for detecting a weld seam between a case and a top cover of a battery. The detection apparatus includes:

an image acquisition component configured to shoot the weld seam, the image acquisition component being located obliquely above an outer side of the weld seam and forming an included angle with a height direction of the battery; and a controller configured to obtain a protruding height of the weld seam relative to a reference surface area on an outer side wall of the case according to a first distance between the image acquisition component and the outer side wall of the case, a second distance between the image acquisition component and the weld seam, and the included angle, and compare the protruding height with a preset height threshold to determine whether the protruding height of the weld seam is qualified.

In this embodiment, the image acquisition component is arranged at a suitable shooting angle to obtain the distance between the image acquisition component and the outer side wall of the case and the weld seam, thus obtaining the protruding height of the weld seam relative to the outer side wall of the case, and determining whether the protruding height of the weld seam is qualified. This method can automatically detect the flange dimension defect of the battery, improve the detection accuracy, reduce missed detections, and thus reduce the risk caused by abnormal flange dimension to the working safety of the battery.

In some embodiments, the battery is provided with one image acquisition component respectively on two sides along a width direction of the battery, and the image acquisition component is configured to move along a length direction of the battery relative to the weld seam in a detection process.

This embodiment can detect the protruding height of the weld seam of the battery relative to the outer side wall of the case more quickly and efficiently, and the detection processes of the weld seam on two sides do not interfere with each other.

In some embodiments, the controller is configured to: determine that the protruding height of the weld seam is unqualified in a case that multiple positions with the protruding height exceeding the preset height threshold exist on the weld seam within a first preset distance range in an extension direction of the weld seam and the number exceeds a preset value.

In this embodiment, only when multiple points with the protruding height exceeding the preset value exist in the extension direction of the weld seam, it will be determined that the protruding height has a defect. This determination logic indicates that there is indeed a small segment of the weld seam with the protruding height exceeding the preset value, thus reducing the probability of false detection, avoiding the detection error caused by the shaking of the image acquisition components during the relative movement of the battery, and improving the detection accuracy of the welding.

In some embodiments, the controller is configured to select a maximum value of the protruding height of the weld seam in the height direction at the same position in the extension direction of the weld seam.

In this embodiment, the maximum value of the protruding height of the weld seam in the height direction is selected for determination, thus truly reflecting whether the protruding height of the weld seam at a specific position in the extension direction exceeds the preset value, reducing the probability of missed detection, and improving the detection accuracy of the weld seam.

In some embodiments, the reference surface area is preset to be spaced apart from the weld seam in the height direction.

In this embodiment, considering the influence of welding high temperature below the weld seam, which easily causes slight deformation or residual solder and results in poor flatness of the surface of the case immediately below the weld seam, the reference surface area and the weld seam area are spaced apart, thus avoiding the uneven area below the weld seam, improving the flatness of the reference surface area, and improving the accuracy of detecting the protruding height of the weld seam.

In some embodiments, the controller is configured to divide the weld seam into multiple detection areas in the extension direction of the weld seam, fit a sub-reference surface area corresponding to each detection area on an outer surface of the case, and select the corresponding sub-reference surface area for calculation when the protruding height of the weld seam in each detection area is obtained.

In this embodiment, the weld seam is divided into multiple detection areas in the extension direction of the weld seam. When the surface area of the case of the battery is large and it is prone to deformation, the true protruding height of the weld seam can be more accurately obtained, thus improving the accuracy of detecting the protruding height of the weld seam.

In some embodiments, the controller is configured to establish at least one plane parallel to the outer side wall of the case in an image to intersect with the weld seam to obtain an intersecting line which is a contour line of a surface of the weld seam, fit a spatial line by taking multiple points on the intersecting line, calculate a distance between each of the multiple points on the intersecting line and the spatial line, and compare the distance with a preset distance threshold to determine whether an appearance defect exists in the weld seam.

In this embodiment, whether the appearance defect exists is determined according to the fluctuation of each point on the contour line of the weld seam relative to the fitted spatial line. Based on the protruding height of the weld seam relative to the outer side wall of the case obtained by the image acquisition component, the appearance defect in the weld seam can be further determined, thus more comprehensively inspecting the quality of the weld seam. Moreover, the image acquisition component is arranged at an included angle α relative to the height direction, thus more comprehensively obtaining the image of each contour area in the cross section of the weld seam, and more comprehensively detecting the appearance defect in the weld seam. In addition, when determining the fluctuation of each point on the contour line, a spatial line is fitted by taking multiple points on the intersecting line as a reference line for determining the fluctuation of each point on the contour line, thus compensating for the error caused by the overall upward or downward inclination of the contour of the weld seam in determining the fluctuation of each point.

In some embodiments, the controller is configured to: determine that the appearance defect exists in the weld seam in a case that points with the distance exceeding the preset distance threshold consecutively exist on the weld seam within a second preset distance range in the extension direction of the weld seam.

In this embodiment, only when multiple points with the protruding height exceeding the preset distance threshold exist in the extension direction of the weld seam, it will be determined that the weld seam has a defect, thus reducing the probability of false detection, avoiding the detection error caused by the shaking of the image acquisition components during the relative movement of the battery, and improving the appearance detection accuracy of the weld seam.

In some embodiments, the controller is configured to determine a type of the appearance defect in the weld seam according to a deviation direction and positions of the points with the distance exceeding the preset distance threshold relative to the spatial line in a case that the appearance defect exists in the weld seam.

In this embodiment, the type of the appearance defect in the weld seam can be determined according to the fluctuation direction of the points with the distance exceeding the preset distance threshold to further determine the type of the defect in a case that the appearance defect exists, thus adjusting the welding process in a timely manner according to the type of the appearance defect in the weld seam in the production process.

According to a second aspect, the present application provides a welding detection method for detecting a weld seam between a case and a top cover of a battery. The welding detection method includes a weld seam protruding height detection step. The weld seam protruding height detection step includes:

obtaining a protruding height of the weld seam relative to a reference surface area on an outer side wall of the case according to a first distance between an image acquisition component and the outer side wall of the case, a second distance between the image acquisition component and the weld seam, and an included angle, where the image acquisition component is configured to shoot the weld seam, and the image acquisition component is located obliquely above an outer side of the weld seam and forms the included angle with a height direction of the battery; and comparing the protruding height with a preset height threshold to determine whether the protruding height of the weld seam is qualified.

In some embodiments, the comparing the protruding height with a preset height threshold to determine whether the protruding height of the weld seam is qualified includes:

determining that the protruding height of the weld seam is unqualified in a case that points with the protruding height exceeding the preset height threshold consecutively exist on the weld seam within a first preset distance range in an extension direction of the weld seam.

In some embodiments, a maximum value of the protruding height of the weld seam in the height direction is selected at the same position in the extension direction of the weld seam.

In some embodiments, selecting the reference surface area on the outer side wall of the case includes:

selecting the reference surface area to be spaced apart from the weld seam in the height direction.

In some embodiments, the weld seam protruding height detection step further includes:

dividing the weld seam into multiple detection areas in the extension direction of the weld seam;

fitting a sub-reference surface area corresponding to each detection area on an outer surface of the case, the reference surface area including multiple sub-reference surface areas; and selecting the corresponding sub-reference surface area for calculation when the protruding height of the weld seam in each detection area is obtained.

In some embodiments, the welding detection method further includes a weld seam appearance defect detection step. The weld seam appearance defect detection step includes:

establishing at least one plane parallel to the outer side wall of the case in an image to intersect with the weld seam to obtain an intersecting line which is a contour line of a surface of the weld seam;

fitting a spatial line by taking multiple points on the intersecting line, and calculating a distance between each of the multiple points on the intersecting line and the spatial line; and comparing the distance with a preset distance threshold to determine whether an appearance defect exists in the weld seam.

In some embodiments, the comparing the distance with a preset distance threshold to determine whether an appearance defect exists in the weld seam includes:

determining that the appearance defect exists in the weld seam in a case that points with the distance exceeding the preset distance threshold consecutively exist on the weld seam within a second preset distance range in the extension direction of the weld seam.

In some embodiments, the weld seam appearance defect detection step further includes:

determining a type of the appearance defect in the weld seam according to a deviation direction and positions of the points with the distance exceeding the preset distance threshold relative to the spatial line in a case that the appearance defect exists in the weld seam.

BRIEF DESCRIPTION OF THE DRAWINGS

To describe the technical solutions of the embodiments of the present application more clearly, the following briefly introduces the drawings required in the embodiments of the present application. Clearly, the drawings described below are only some embodiments of the present application. Those of ordinary skill in the art can also obtain other drawings according to the drawings without contributing any inventive labor.

Figure 1:
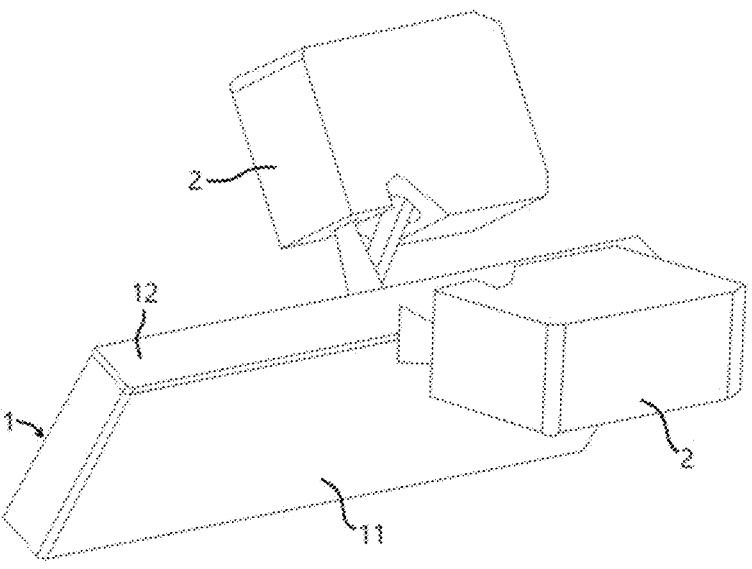
FIG. 1 is a schematic diagram of image acquisition components respectively arranged on two sides of a battery in a welding detection apparatus according to the present application.

In the drawings, the drawings are not drawn in an actual proportion.

DESCRIPTION OF REFERENCE NUMERALS

1—battery; 11—case; 12—top cover; 2—image acquisition component; and 3—weld seam.

DETAILED DESCRIPTION

Implementations of the present application will be described in further detail below in conjunction with the drawings and embodiments. The following detailed description of the embodiments and the accompanying drawings are used to exemplarily explain the principles of the present application, but should not be configured to limit the scope of the present application, that is, the present application is not limited to the described embodiments.

In the descriptions of the embodiments of the present application, the term "multiple" refers to more than two (including two), and similarly, "multiple groups" refers to more than two groups (including two groups); and "multiple pieces" refers to more than two pieces (including two pieces).

The orientations or positional relationships indicated by the terms "upper", "lower", "top", "bottom", "front", "rear", "inner", "outer" and the like are used in the present application only for facilitating the description of the present application, rather than indicating or implying that the apparatus referred to needs to have a particular orientation or be constructed and operated in a particular orientation, and therefore they shall not be interpreted as limiting the protection scope of the present application.

Moreover, the terms "first", "second", "third" and the like are used for descriptive purposes only and are not to be construed as indicating or implying relative importance. "Perpendicular" is not strictly perpendicular, but within the allowable range of errors. "Parallel" is not strictly parallel, but within the allowable range of errors. Orientation words appearing in the following description are all directions shown in the drawings, and do not limit the specific structure of the present application.

In the description of the present application, it should be further noted that unless otherwise explicitly specified and limited, the terms "mount", "connect", and "connected" should be understood in a broad sense. For example, it may be fixed connection, detachable connection, or integral connection; or it may be direct connection, or indirect connection through an intermediate medium. For those of ordinary skill in the art, the specific meanings of the above terms in the present application may be understood according to specific circumstances.

Reference herein to "an embodiment" means that a particular feature, structure, or characteristic described in conjunction with the embodiment may be included in at least some embodiments of the present application. The term appearing at different positions of this description may not refer to the same embodiment or an independent or alternative embodiment that is mutually exclusive with another embodiment. Those skilled in the art can explicitly or implicitly understand that the embodiments described herein may be combined with other embodiments.

An existing battery cell generally includes a case and an electrode assembly accommodated in the case, and the case is filled with electrolyte. The electrode assembly is mainly formed by stacking or winding a first electrode plate and a second electrode plate having a polarity opposite to that of the first electrode plate. Furthermore, an insulating member, for example, a membrane, is generally arranged between the first electrode plate and the second electrode plate. Portions of both the first electrode plate and the second electrode plate that are coated with active materials constitute a main body part of the electrode assembly, and portions of both the first electrode plate and the second electrode plate that are not coated with active materials respectively constitute a first tab and a second tab. In a battery cell, the first electrode plate may be a positive electrode plate, including a positive current collection member and positive active material layers arranged on two sides of the positive current collection member. The positive current collector may use a metal foil or a composite current collector. For example, as the metal foil, silver surface-treated aluminum or stainless steel, stainless steel, copper, aluminum, nickel, baked carbon, carbon, nickel, titanium, or the like may be used. The composite current collector may include a high molecular material substrate layer and a metal layer. The composite current collector may be formed by forming a metal material (such as aluminum, aluminum alloy, nickel, nickel alloy, titanium, titanium alloy, silver, and silver alloy) on a polymer material substrate (such as a substrate of polypropylene, polyethylene terephthalate, polybutylene terephthalate, polystyrene, or polyethylene). The positive electrode active material may include at least one of the following materials: a lithium-containing phosphate, a lithium transition metal oxide, and modified compounds thereof. However, the present application is not limited to such materials, and may alternatively use another conventional material that may be used as a positive electrode active material for batteries. These positive active materials may be used alone or two or more of these positive active materials may be combined for use. Each second electrode plate may be a negative electrode plate, including a negative current collection member and negative active material layers arranged on two sides of the negative current collection member. The negative current collector may use a metal foil or a composite current collector. For example, as the metal foil, silver surface-treated aluminum or stainless steel, stainless steel, copper, aluminum, nickel, baked carbon, carbon, nickel, titanium, or the like may be used. The composite current collector may include a high molecular material substrate layer and a metal layer. The composite current collector may be formed by forming a metal material (such as copper, copper alloy, nickel, nickel alloy, titanium, titanium alloy, silver, and silver alloy) on a polymer material substrate (such as a substrate of polypropylene, polyethylene terephthalate, polybutylene terephthalate, polystyrene, or polyethylene). The negative active material layers may use a negative active material that are commonly known in this field and are applied to batteries. As an example, the negative electrode active material may include at least one of the following materials: artificial graphite, natural graphite, soft carbon, hard carbon, a silicon-based material, a tin-based material, lithium titanate, and the like. Optionally, the first electrode plate may also be a negative electrode plate, and correspondingly, the second electrode plate is a positive electrode plate. The first tab and the second tab may be located at one end of the main body part jointly or at two ends of the main body part separately. In charging and discharging processes of the battery cell, the positive active material and the negative active material react with the electrolyte, and the tabs are connected to electrode terminals to form a current loop.

The battery cell may be a secondary battery, and the secondary battery refers to a battery cell that can be used continually by activating an active material in a charging method after the battery cell is discharged.

The battery cell may be a lithium-ion battery, a sodium-ion battery, a sodium/lithium-ion battery, a lithium metal battery, a sodium metal battery, a lithium sulfur battery, a magnesium-ion battery, a nickel hydrogen battery, a nickel cadmium battery, a lead storage battery, and the like. The embodiments of the present application are not limited to this.

As an example, the battery cell may be a cylindrical battery cell, a prismatic battery cell, a pouch cell, or a battery cell in another shape. The prismatic battery cell includes a square-case battery cell, a blade-shaped battery cell, and a multi-prism battery. For example, the multi-prism battery may be a hexagonal prism battery. The present application has no special limitation.

Taking a battery cell as an example, connection between a top cover and a case of the battery cell is achieved through welding. Generally, a weld seam protrudes from an outer side wall of the case, also known as flanging. If the protruding height is abnormal, due to the tight fit between adjacent battery cells during assembling, the protruding weld seam will exert pressure on adjacent battery cells, causing deformation of the case or damage to an insulating film, posing a risk of short circuit and posing a great safety risk to the battery.

At present, the production line detects the weld seam through manual visual inspection combined with manual touch. However, the efficiency of manual visual inspection is low, uncontrollable factors may easily cause missed detection of defects in the weld seam, and the accuracy is low.

Figure 2:
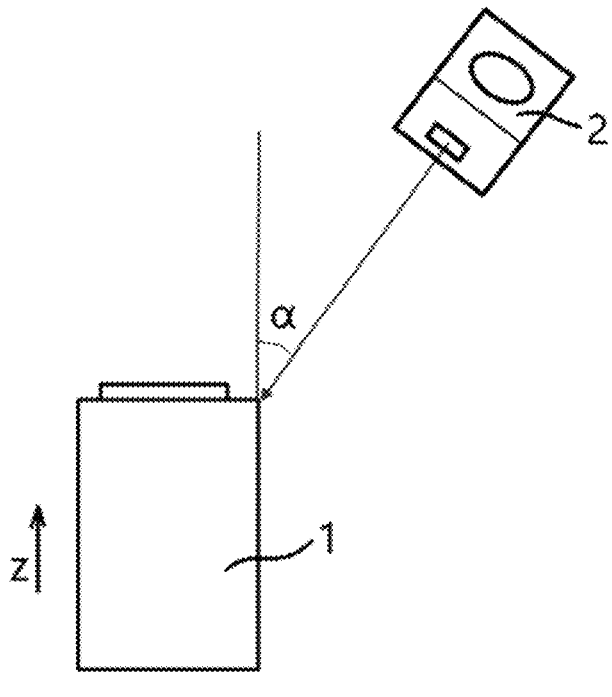
FIG. 2 is a schematic diagram of a position relationship between an image acquisition component and a battery.

In view of the above problems, the present application provides a welding detection apparatus for detecting a weld seam 3 between a case 11 and a top cover 12 of a battery 1. Referring to FIG. 1 and FIG. 2, the detection apparatus includes: an image acquisition component 2 configured to shoot the weld seam 3, the image acquisition component 2 being located obliquely above an outer side of the weld seam 3 and forming an included angle $\alpha$ with a height direction z of the battery 1; and a controller configured to obtain a protruding height H of the weld seam 3 relative to a reference surface area on an outer side wall of the case 11 according to a first distance H1 between the image acquisition component 2 and the outer side wall of the case 11, a second distance H2 between the image acquisition component 2 and the weld seam 3, and the included angle $\alpha$, and compare the protruding height H with a preset height threshold to determine whether the protruding height of the weld seam 3 is qualified.

The battery 1 may be a battery cell or a battery pack, and the top cover 12 is arranged at an end portion of the case 11 along the height direction z. The image acquisition component 2 may be a camera, such as a 3D camera, which can obtain the distance according to the difference between the time of transmitting laser and the time of receiving laser.

In a case that the shooting field of the image acquisition component 2 can meet the overall shooting requirement of the weld seam 3, the image acquisition component 2 may be fixed in position relative to the battery 1. In a case that the shooting field of the image acquisition component 2 cannot meet the overall shooting requirement of the weld seam 3, the image acquisition component 2 and the weld seam 3 may be movable relative to each other to obtain images at different positions of the weld seam 3. The battery 1 or the image acquisition component 2 being movable is an optional manner. For example, battery 1 is cuboid-shaped, and the image acquisition component 2 or the battery 1 may be enabled to move; or the battery 1 may be cylindrical, the image acquisition component 2 may be enabled to be fixed and the battery 1 may be enabled to rotate around a central axis.

Referring to FIG. 2, the image acquisition component 2 is located obliquely above an outer side of the weld seam 3 and forms an included angle $\alpha$ with a height direction z of the battery 1. The shooting direction of the image acquisition component 2 and the height direction z of the battery 1 form an included angle $\alpha$. The shooting surface of the image acquisition component 2 is parallel to a tangent line of the weld seam 3. Optionally, the range of the included angle $\alpha$ is 45°±5°. Within this range, the repeatability and consistency of the measured protruding height of the weld seam 3 are high, and other defects in the weld seam 3 can be comprehensively detected, thus not only preventing the image acquisition component 2 from partially losing the protruding height data due to the included angle α being too small, but also prevent the situation that other defects in some of the weld seam 3 cannot be recognized due to the included angle α being too large, although it can better obtain the protruding height data of the weld seam 3.

Figure 4:
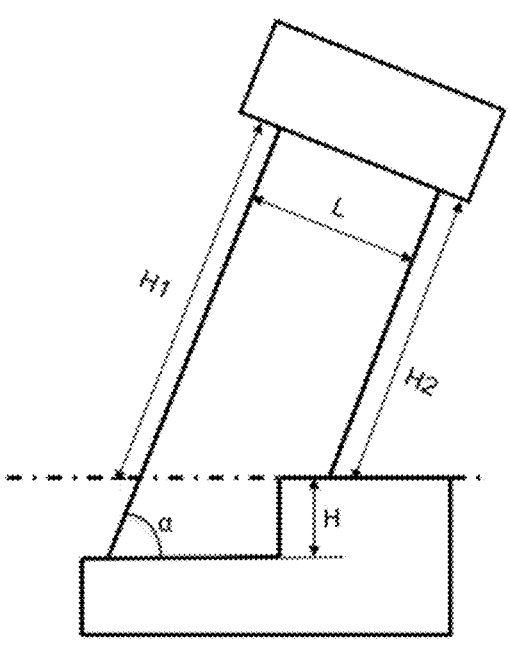
FIG. 4 is a schematic diagram of calculating the protruding height of a weld seam.

The controller is configured to obtain a protruding height H of the weld seam 3 relative to a reference surface area on an outer side wall of the case 11 according to a first distance H1 between the image acquisition component 2 and the outer side wall of the case 11, a second distance H2 between the image acquisition component 2 and the weld seam 3, and the included angle α, and compare the protruding height H with a preset height threshold to determine whether the protruding height of the weld seam 3 is qualified. For example, referring to FIG. 4, according to the principle of triangular reflection, the protruding height H is calculated through the following formula:

$$H=(H1-H2-L/\tan \alpha)*\sin \alpha,$$

where L is the width of the light illuminating the weld seam 3 and the reference surface area in the height direction z.

The first distance H1 may be directly determined according to the mounting position of the image acquisition component 2 and the mounting position and dimension of the battery 1. The second distance H2 may be determined through data of multiple positions obtained in real time along the extension direction of the weld seam 3.

In this embodiment, the image acquisition component 2 is arranged at a suitable shooting angle to obtain the distance between the image acquisition component 2 and the outer side wall of the case 11 and the weld seam 3, thus obtaining the protruding height H of the weld seam 3 relative to the outer side wall of the case 11, and determining whether the protruding height of the weld seam 3 is qualified. This method can automatically detect the flange dimension defect of the battery 1, improve the detection accuracy, reduce missed detections, and thus reduce the risk caused by abnormal flange dimension to the working safety of the battery 1.

In some embodiments, the battery 1 is provided with one image acquisition component 2 respectively on two sides along a width direction of the battery, and the image acquisition component 2 is configured to move along a length direction of the battery 1 relative to the weld seam 3 in a detection process.

The battery 1 is cuboid-shaped, the image acquisition components 2 on the two sides of the battery 1 are arranged opposite to each other along its width direction, and the included angles α formed with the height direction z of the battery 1 are the same. For example, the battery 1 may be movable along the length direction to achieve the movement of the weld seam 3 on the two long sides of the battery 1 relative to the image acquisition components 2 on the two sides; or the image acquisition components 2 on the two sides may be movable along the length direction of the battery 1. Optionally, the image acquisition components 2 may also be respectively arranged on the two sides of the battery 1 along its length direction to detect the weld seam 3 on the two short sides of the battery 1.

This embodiment can detect the protruding height of the weld seam 3 of the battery 1 relative to the outer side wall of the case 11 more quickly and efficiently, and the detection processes of the weld seam 3 on two sides do not interfere with each other.

In some embodiments, the controller is configured to: determine that the protruding height of the weld seam 3 is unqualified in a case that multiple positions with the protruding height exceeding the preset height threshold exist on the weld seam 3 within a first preset distance range in an extension direction of the weld seam 3 and the number exceeds a preset value.

For example, for a cuboid-shaped battery 1, the extension direction of the weld seam 3 on the long side of the battery 1 is the length direction of the battery 1, and the extension direction of the weld seam 3 on the short side of the battery 1 is the width direction of the battery 1. For a cylindrical battery 1, the extension direction of the weld seam 3 is circular. During the gradual relative movement between the image acquisition component 2 and the weld seam 3, the second distance H2 is obtained in real time. Within the preset distance range, if the number of acquired multiple points with the second distance H2 exceeding the preset height threshold exceeds a preset value, whether the multiple points are consecutive or non-consecutive, it will be determined that the protruding height of the weld seam 3 has a defect.

In this embodiment, only when multiple points with the protruding height exceeding the preset value exist in the extension direction of the weld seam 3, it will be determined that the protruding height has a defect. This determination logic indicates that there is indeed a small segment of the weld seam 3 with the protruding height exceeding the preset value, thus reducing the probability of false detection, avoiding the detection error caused by the shaking of the image acquisition components 2 during the relative movement of the battery 1, and improving the detection accuracy of the welding.

In some embodiments, the controller is configured to select a maximum value of the protruding height of the weld seam 3 in the height direction z at the same position in the extension direction of the weld seam 3.

Figure 5:
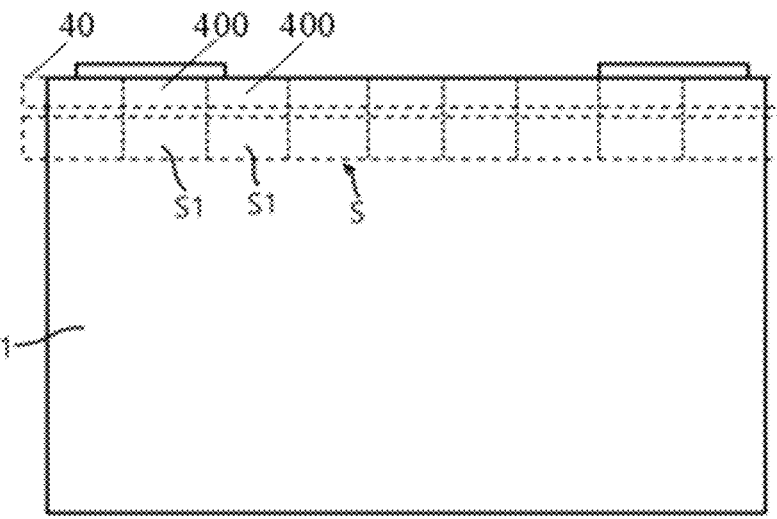
FIG. 5 is a schematic diagram of fitting a sub-reference surface area corresponding to each detection area on an outer surface of a case.

Referring to FIG. 5, the dashed grid area at the upper portion is the area where the weld seam 3 is located. At the same position in the extension direction of the weld seam 3, the image acquisition component 2 obtains the second distance H2 of multiple discrete points on the surface of the weld seam 3 along the height direction z. At the same time, during the movement of the image acquisition component 2 relative to the weld seam 3, the second distance H2 of multiple positions may be obtained along the extension direction of the weld seam 3. When determining the protruding height at a specific position in the extension direction of the weld seam 3, it is characterized by the maximum protruding height in the height direction z.

In this embodiment, the maximum value of the protruding height of the weld seam 3 in the height direction z is selected for determination, thus truly reflecting whether the protruding height of the weld seam 3 at a specific position in the extension direction exceeds the preset value, reducing the probability of missed detection, and improving the detection accuracy of the weld seam 3.

In some embodiments, referring to FIG. 5, the reference surface area S is preset to be spaced apart from the weld seam 3 in the height direction z.

In FIG. 5, the dashed box at the upper portion represents a weld seam area 40, and the dashed box at the lower portion represents the reference surface area S. The weld seam area 40 is spaced apart from the reference surface area S. For example, the detection area of the weld seam for the protruding height of the weld seam 3 is defined as 0-2.0 mm below the surface of the top cover 12 away from the case 11, and the reference surface area S is defined as 3.0 mm-3.5 mm below the surface of the top cover 12 away from the case 11. This numerical range may be set according to the actual width of the weld seam 3.

In this embodiment, considering the influence of welding high temperature below the weld seam 3, which easily causes slight deformation or residual solder and results in poor flatness of the surface of the case 11 immediately below the weld seam 3, the reference surface area S and the weld seam area are spaced apart, thus avoiding the uneven area below the weld seam 3, improving the flatness of the reference surface area S, and improving the accuracy of detecting the protruding height of the weld seam 3.

In some embodiments, referring to FIG. 5, the controller is configured to divide the weld seam area 40 into multiple detection areas 400 in the extension direction of the weld seam, fit a sub-reference surface area S1 corresponding to each detection area 400 on an outer surface of the case 11, and select the corresponding sub-reference surface area S1 for calculation when the protruding height of the weld seam 3 in each detection area 400 is obtained.

When the surface area of the case 11 of the battery 1 is large, deformation is prone to occur. For example, for a cuboid-shaped battery 1, the largest surface of the case 11 is prone to deformation. When detecting the weld seam 3 on the long side of the battery 1, the weld seam 3 may be divided into multiple detection areas along the length direction of the battery 1, which may be evenly divided. The number of the detection areas may be set according to the length of the weld seam 3. The reference surface area S on the case 11 is also correspondingly divided into multiple sub-reference surface areas S1. The multiple detection areas correspond to the multiple sub-reference surface areas S1 one to one. Each detection area has the same dimension as the corresponding sub-reference surface area S1 in the extension direction of the weld seam 3, and each detection area is spaced apart from the corresponding sub-reference surface area S1 in the height direction z.

Optionally, when the surface area of the case 11 of the battery 1 is small, only one overall reference surface area S may be set.

In this embodiment, the weld seam 3 is divided into multiple detection areas in the extension direction of the weld seam. When the surface area of the case 11 of the battery 1 is large and it is prone to deformation, the true protruding height of the weld seam 3 can be more accurately obtained, thus improving the accuracy of detecting the protruding height of the weld seam 3.

Figure 3:
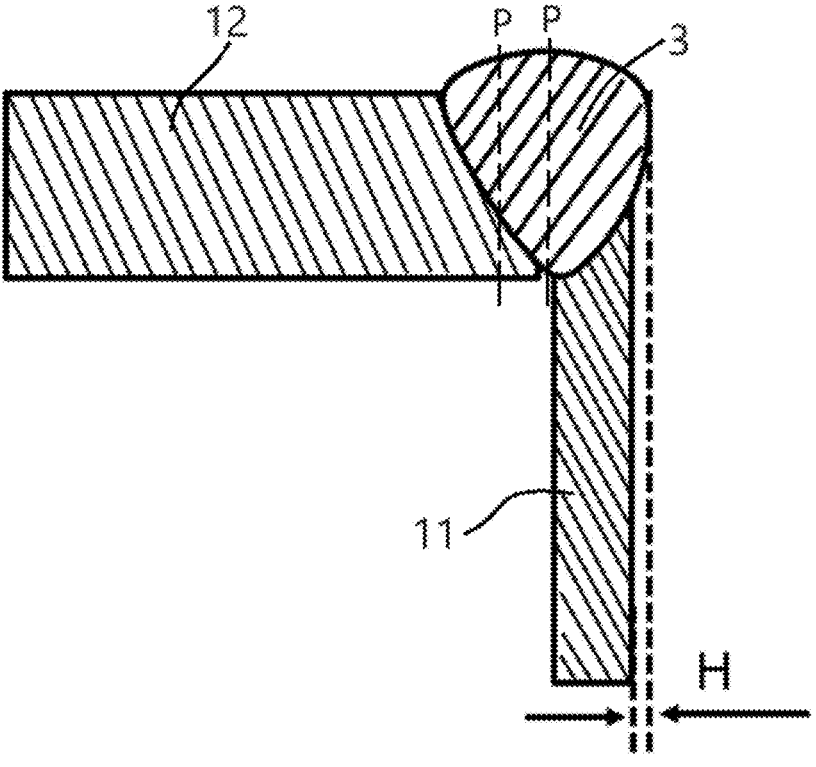
FIG. 3 is a schematic diagram of a normal weld seam between a top cover and a case of a battery.

In some embodiments, referring to FIG. 3, the controller is configured to establish at least one plane P parallel to the outer side wall of the case 11 in the image to intersect with the weld seam 3 to obtain an intersecting line which is a contour line of a surface of the weld seam 3, fit a spatial line by taking multiple points on the intersecting line, calculate a distance between each of the multiple points on the intersecting line and the spatial line, and compare the distance with a preset distance threshold to determine whether an appearance defect exists in the weld seam 3.

Figure 6A:
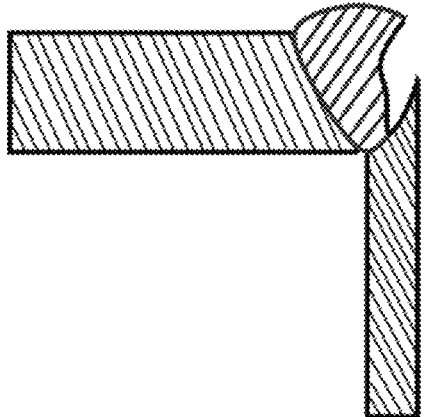
FIG. 6A to FIG. 6E are schematic diagrams of weld seams with different defects.
Figure 6B:
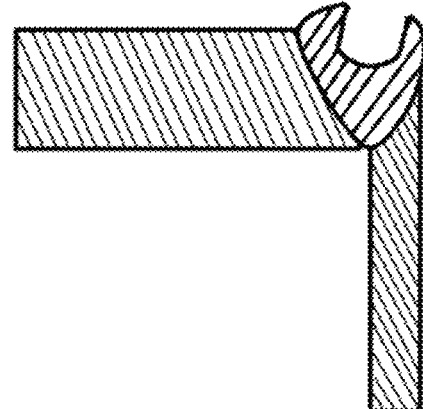
Figure 6C:
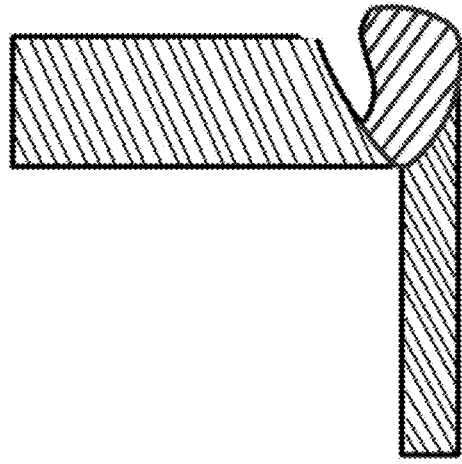
Figure 6D:
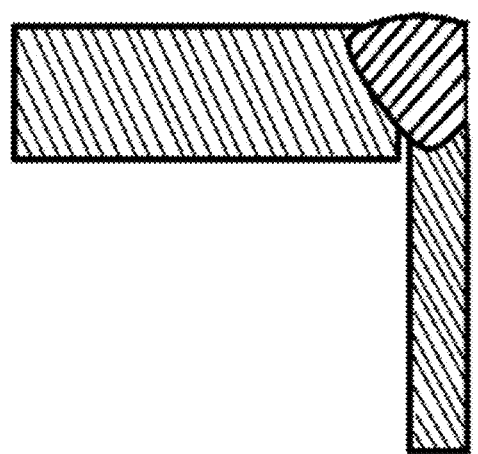
Figure 6E:
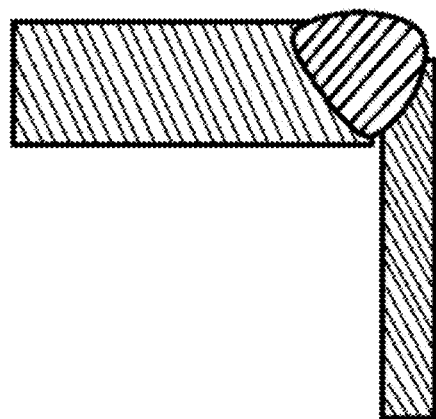

When 45°±5° is selected, the repeatability and consistency of the measured protruding height of the weld seam 3 are high, and defects such as inner and outer undercuts can be detected; when α<40°, the appearance defect such as the outer undercut cannot be effectively recognized. Due to the protrusion of the weld seam 3 relative to the outer side wall of the case 11, the scanning data of the image acquisition component 2 is partially lost; when α>50°, although relatively complete data on the protruding height of the weld seam 3 may be obtained, defects such as inner undercuts cannot be recognized. For example, FIG. 6A shows an outer undercut defect, that is, a notch appears on the outer side of the weld seam 3; FIG. 6B shows a burst defect, that is, a small dot appears on the surface of the weld seam 3; FIG. 6C shows an inner undercut defect, that is, a notch appears on the inner side of the weld seam 3; FIG. 6D shows an external polarization defect, that is, the welding position of the weld seam 3 is located outwards, causing a portion protruding from the outer surface of the case 11 to be missed; and FIG. 6E shows an internal polarization defect, that is, the welding position of the weld seam 3 is located inwards, causing it to be retracted inwards relative to the outer surface of the case 11.

Referring to FIG. 3, at least one plane P parallel to the outer side wall of the case 11 is established in the image to intersect with the weld seam 3. One plane P may be set, or multiple planes P may be spaced apart in the direction perpendicular to the side wall of the case 11 to obtain a contour line of the surface of the weld seam 3 at multiple different positions, thus more comprehensively detecting the appearance defect on the surface of the weld seam 3. In addition, for each intersecting line, it represents a contour line of the weld seam 3 at a specific position perpendicular to the side wall of the case 11. Multiple points on this contour line are selected to fit a spatial line. The spatial line is used as a reference line to calculate the degree of deviation of the multiple points from the reference line. If the degree of deviation exceeds the preset value, it is determined that the weld seam 3 has an appearance defect near this point.

Figure 7A:
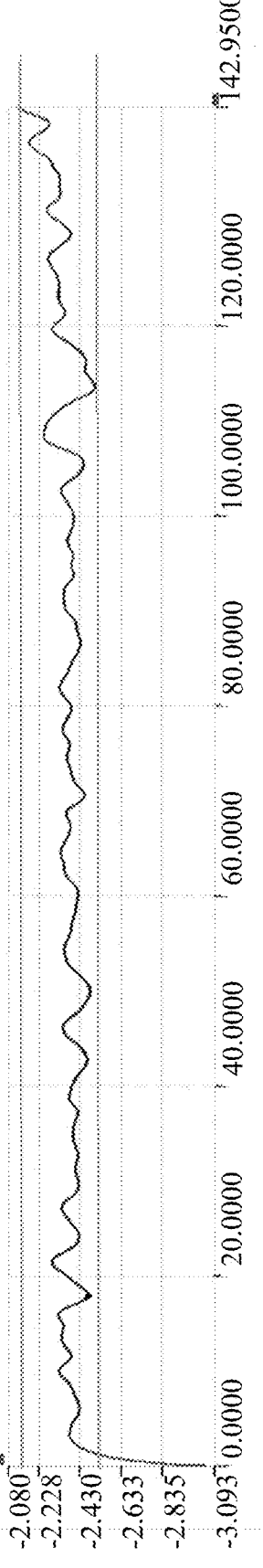
FIG. 7A is a schematic diagram of a contour line of a product with a qualified weld seam.
Figure 7B:
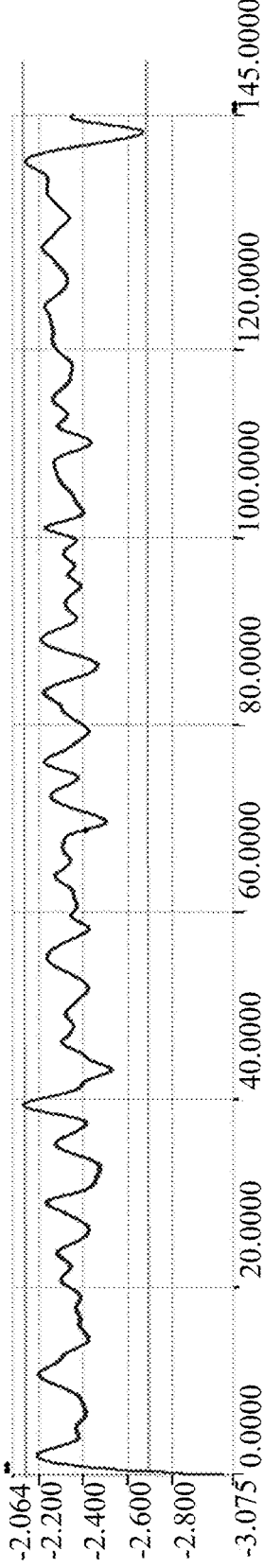
FIG. 7B is a schematic diagram of a contour line of a product with an unqualified weld seam.

For the contour line formed by a certain plane P, FIG. 7A is a schematic diagram of a contour line of a product with a qualified weld seam. Each point on the contour line is within a preset distance threshold range relative to the spatial line, with a fluctuation range of −2.16 mm to −2.5 mm; FIG. 7B is a schematic diagram of a contour line of a product with an unqualified weld seam. Some points on the contour line have greater fluctuations relative to the spatial line, exceeding the preset distance threshold, with a fluctuation range of −2.14 mm to −2.7 mm. The type of the defect may be determined according to the fluctuation direction of the points. If the fluctuation direction is upward, it indicates that the surface of the weld seam 3 is bulging, and if it is downward, it indicates that an undercut or a burst defect appears on the surface of the weld seam 3.

Figure 8:
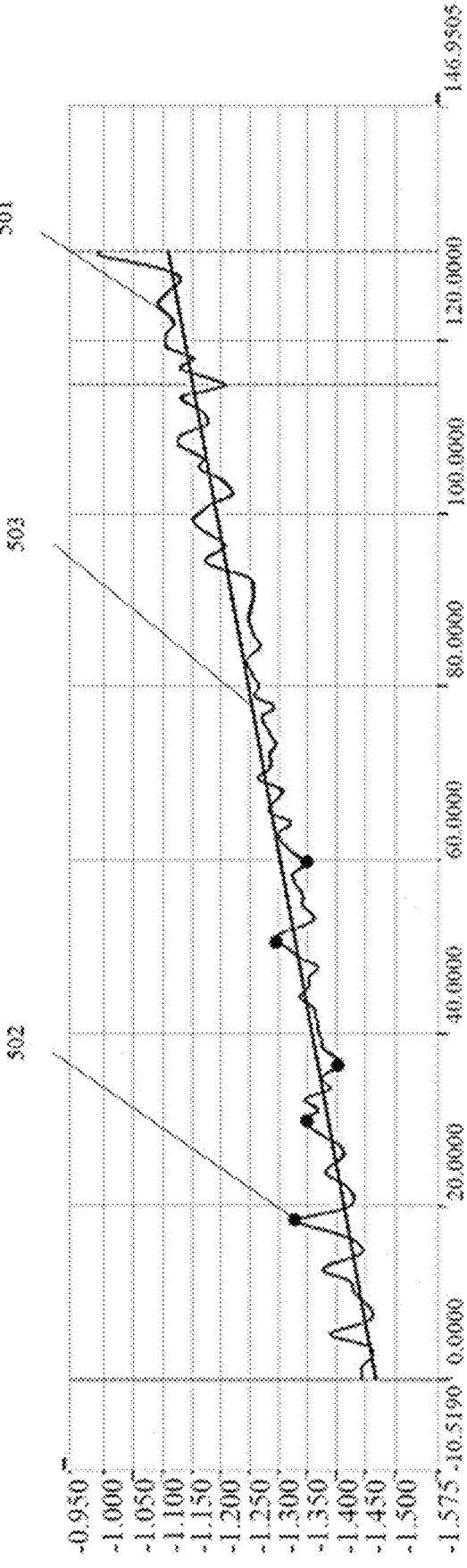
FIG. 8 is a schematic diagram of fitting a spatial line by taking multiple points on a contour line and determining an appearance defect in a weld seam according to the fluctuation of the contour line determined based on the spatial line.

Due to the inevitable positioning error of the fixture or positioning mechanism for the battery 1, the overall contour line may rise or fall uniformly. Referring to FIG. 8, if the fluctuation of each point on the contour line is determined solely by the horizontal line, it cannot truly reflect the surface condition of the weld seam 3. By fitting the spatial line 503 by taking multiple points 502 on the intersecting line 501 as the reference line for determining the fluctuation of each point on the contour line, it can compensate for the error caused by the overall upward or downward inclination of the contour line of the weld seam 3 in determining the fluctuation of each point.

In this embodiment, whether the appearance defect exists is determined according to the fluctuation of each point on the contour line of the weld seam 3 relative to the fitted spatial line. Based on the protruding height of the weld seam 3 relative to the outer side wall of the case 11 obtained by the image acquisition component 2, the appearance defect in the weld seam 3 can be further determined, thus more comprehensively inspecting the quality of the weld seam 3. Moreover, the image acquisition component 2 is arranged at an included angle α relative to the height direction, thus more comprehensively obtaining the image of each contour area in the cross section of the weld seam 3, and more comprehensively detecting the appearance defect in the weld seam 3. In addition, when determining the fluctuation of each point on the contour line, a spatial line is fitted by taking multiple points on the intersecting line as a reference line for determining the fluctuation of each point on the contour line, thus compensating for the error caused by the overall upward or downward inclination of the contour of the weld seam 3 in determining the fluctuation of each point.

In some embodiments, the controller is configured to: determine that the appearance defect exists in the weld seam 3 in a case that points with the distance exceeding the preset distance threshold consecutively exist on the weld seam 3 within a second preset distance range in the extension direction of the weld seam 3.

In the process of gradually moving relative to the weld seam 3, the image acquisition component 2 obtains an image of the weld seam 3 in real time. If multiple points with the distance to the fitted spatial line exceeding the preset distance threshold exist on the contour line of the weld seam 3 in the image, it will be determined that the appearance defect exists in the weld seam 3.

In this embodiment, only when multiple points with the protruding height exceeding the preset distance threshold exist in the extension direction of the weld seam 3, it will be determined that the weld seam 3 has a defect, thus reducing the probability of false detection, avoiding the detection error caused by the shaking of the image acquisition components 2 during the relative movement of the battery 1, and improving the appearance detection accuracy of the weld seam.

In some embodiments, the controller is configured to determine a type of the appearance defect in the weld seam 3 according to a deviation direction and positions of the points with the distance exceeding the preset distance threshold relative to the spatial line in a case that the appearance defect exists in the weld seam 3.

The type of the defect may be determined according to the fluctuation direction of the points. If the fluctuation direction is upward, it indicates that the surface of the weld seam 3 is bulging, and if it is downward, it indicates that an undercut or a burst defect appears on the surface of the weld seam 3.

In this embodiment, the type of the appearance defect in the weld seam 3 can be determined according to the fluctuation direction of the points with the distance exceeding the preset distance threshold to further determine the type of the defect in a case that the appearance defect exists, thus adjusting the welding process in a timely manner according to the type of the appearance defect in the weld seam in the production process.

In some specific embodiments, referring to FIG. 1 to FIG. 5, the working principle of the welding detection apparatus in the present application will be described below by taking a cuboid-shaped battery 1 as an example.

The battery 1 is provided with image acquisition components 2 on two sides of its width direction, the image acquisition components 2 on the two sides are arranged opposite to each other, the included angles α formed with the height direction z of the battery 1 are the same, and the range of the included angles is 45°±5°. For example, the battery 1 and the image acquisition components 2 may be movable along the length direction of the battery 1 to achieve the movement of the weld seam 3 on the two long sides of the battery 1 relative to the image acquisition components 2 on the two sides. Optionally, the image acquisition components 2 may also be respectively arranged on the two sides of the battery 1 along its length direction to detect the weld seam 3 on the two short sides of the battery 1.

During the relative movement of the battery 1 and the image acquisition components 2 along the length direction of the battery 1, the image acquisition components 2 may acquire the first distance H1 between it and the outer side wall of the case 11 and the second distance H2 between it and the weld seam 3, and capture an image of the weld seam 3, so that the controller can obtain the protruding height H of the weld seam 3 relative to the reference surface area on the outer side wall of the case 11 according to the first distance H1, the second distance H2 and the included angle α, and determine whether the protruding height of the weld seam 3 is qualified. In addition, the controller can establish at least one plane P parallel to the outer side wall of the case 11 in the captured image to intersect with the weld seam 3 to obtain an intersecting line which is a contour line of a surface of the weld seam 3, fit a spatial line by taking multiple points on the intersecting line, calculate a distance between each of the multiple points on the intersecting line and the spatial line, and compare the distance with a preset distance threshold to determine whether an appearance defect exists in the weld seam 3. This embodiment can achieve the detection of the defect in the weld seam 3, including protruding height detection and appearance defect defection, thus improving the detection accuracy and improving the working safety of the battery 1.

Secondly, the present application provides a welding detection method for detecting a weld seam 3 between a case 11 and a top cover 12 of a battery 1. The welding detection method includes a weld seam 3 protruding height detection step. The weld seam 3 protruding height detection step includes:

obtaining a protruding height of the weld seam 3 relative to a reference surface area on an outer side wall of the case 11 according to a first distance between an image acquisition component 2 and the outer side wall of the case 11, a second distance between the image acquisition component 2 and the weld seam 3, and the included angle α, where the image acquisition component 2 is configured to shoot the weld seam 3 and the image acquisition component 2 is located obliquely above an outer side of the weld seam 3 and forms an included angle α with a height direction z of the battery 1; and comparing the protruding height with a preset height threshold to determine whether the protruding height of the weld seam 3 is qualified.

In this embodiment, the image acquisition component 2 is arranged at a suitable shooting angle to obtain the distance between the image acquisition component 2 and the outer side wall of the case 11 and the weld seam 3, thus obtaining the protruding height H of the weld seam 3 relative to the outer side wall of the case 11, and determining whether the protruding height of the weld seam 3 is qualified. This method can automatically detect the flange dimension defect of the battery 1, improve the detection accuracy, reduce missed detections, and thus reduce the risk caused by abnormal flange dimension to the working safety of the battery 1.

In some embodiments, comparing the protruding height with a preset height threshold to determine whether the protruding height of the weld seam 3 is qualified includes: determining that the protruding height of the weld seam 3 is unqualified in a case that points with the protruding height exceeding the preset height threshold consecutively exist on the weld seam 3 within a first preset distance range in an extension direction of the weld seam 3.

In this embodiment, only when multiple points with the protruding height exceeding the preset value exist in the extension direction of the weld seam 3, it will be determined that the protruding height has a defect. This determination logic indicates that there is indeed a small segment of the weld seam 3 with the protruding height exceeding the preset value, thus reducing the probability of false detection, avoiding the detection error caused by the shaking of the image acquisition components 2 during the relative movement of the battery 1, and improving the detection accuracy of the welding.

In some embodiments, a maximum value of the protruding height of the weld seam 3 in the height direction z is selected at the same position in an extension direction of the weld seam 3.

Referring to FIG. 5, the dashed grid area at the upper portion is the area where the weld seam 3 is located. At the same position in the extension direction of the weld seam 3, the image acquisition component 2 obtains the second distance H2 of multiple discrete points on the surface of the weld seam 3 along the height direction z. At the same time, during the movement of the image acquisition component 2 relative to the weld seam 3, the second distance H2 of multiple positions may be obtained along the extension direction of the weld seam 3. When determining the protruding height at a specific position in the extension direction of the weld seam 3, it is characterized by the maximum protruding height in the height direction z.

In this embodiment, the maximum value of the protruding height of the weld seam 3 in the height direction z is selected for determination, thus truly reflecting whether the protruding height of the weld seam 3 at a specific position in the extension direction exceeds the preset value, reducing the probability of missed detection, and improving the detection accuracy of the weld seam 3.

In some embodiments, selecting the reference surface area S on the outer side wall of the case 11 includes: selecting the reference surface area S to be spaced apart from the weld seam 3 in the height direction z.

In this embodiment, considering the influence of welding high temperature below the weld seam 3, which easily causes slight deformation or residual solder and results in poor flatness of the surface of the case 11 immediately below the weld seam 3, the reference surface area S and the weld seam area are spaced apart, thus avoiding the uneven area below the weld seam 3, improving the flatness of the reference surface area S, and improving the accuracy of detecting the protruding height of the weld seam 3.

In some embodiments, the weld seam 3 protruding height detection step further includes:

dividing the weld seam 3 into multiple detection areas in an extension direction of the weld seam;

fitting a sub-reference surface area S1 corresponding to each detection area on an outer surface of the case 11, the reference surface area S including multiple sub-reference surface areas S1; and selecting the corresponding sub-reference surface area S1 for calculation when the protruding height of the weld seam 3 in each detection area is obtained.

These three steps are sequentially performed. In this embodiment, the weld seam 3 is divided into multiple detection areas in the extension direction of the weld seam. When the surface area of the case 11 of the battery 1 is large and it is prone to deformation, the true protruding height of the weld seam 3 can be more accurately obtained, thus improving the accuracy of detecting the protruding height of the weld seam 3.

In some embodiments, referring to FIG. 3, the welding detection method further includes a weld seam 3 appearance defect detection step. The weld seam 3 appearance defect detection step includes:

establishing at least one plane P parallel to the outer side wall of the case 11 in the image to intersect with the weld seam 3 to obtain an intersecting line which is a contour line of a surface of the weld seam 3;

fitting a spatial line by taking multiple points on the intersecting line, and calculating a distance between each of the multiple points on the intersecting line and the spatial line; and comparing the distance with a preset distance threshold to determine whether an appearance defect exists in the weld seam 3.

The above three steps are sequentially performed. In this embodiment, whether the appearance defect exists is determined according to the fluctuation of each point on the contour line of the weld seam 3 relative to the fitted spatial line. Based on the protruding height of the weld seam 3 relative to the outer side wall of the case 11 obtained by the image acquisition component 2, the appearance defect in the weld seam 3 can be further determined, thus more comprehensively inspecting the quality of the weld seam 3. Moreover, the image acquisition component 2 is arranged at an included angle α relative to the height direction, thus more comprehensively obtaining the image of each contour area in the cross section of the weld seam 3, and more comprehensively detecting the appearance defect in the weld seam 3. In addition, when determining the fluctuation of each point on the contour line, a spatial line is fitted by taking multiple points on the intersecting line as a reference line for determining the fluctuation of each point on the contour line, thus compensating for the error caused by the overall upward or downward inclination of the contour of the weld seam 3 in determining the fluctuation of each point.

In some embodiments, the comparing the distance with a preset distance threshold to determine whether an appearance defect exists in the weld seam 3 includes: determining that the appearance defect exists in the weld seam 3 in a case that points with the distance exceeding the preset distance threshold consecutively exist on the weld seam 3 within a second preset distance range in the extension direction of the weld seam 3.

In this embodiment, only when multiple points with the protruding height exceeding the preset distance threshold exist in the extension direction of the weld seam 3, it will be determined that the weld seam 3 has a defect, thus reducing the probability of false detection, avoiding the detection error caused by the shaking of the image acquisition components 2 during the relative movement of the battery 1, and improving the appearance detection accuracy of the weld seam.

In some embodiments, the weld seam 3 appearance defect detection step further includes: determining a type of the appearance defect in the weld seam 3 according to a deviation direction and positions of the points with the distance exceeding the preset distance threshold relative to the spatial line in a case that the appearance defect exists in the weld seam 3.

In this embodiment, the type of the appearance defect in the weld seam 3 can be determined according to the fluctuation direction of the points with the distance exceeding the preset distance threshold to further determine the type of the defect in a case that the appearance defect exists, thus adjusting the welding process in a timely manner according to the type of the appearance defect in the weld seam in the production process.

The controller described above may be a general-purpose processor, a Programmable Logic Controller (PLC), a Digital Signal Processor (DSP), an Application Specific Integrated Circuit (ASIC), a Field-Programmable Gate Array (FPGA), any other programmable logic device, discrete gate, transistor logic device or discrete hardware component, or any proper combination thereof used for performing the functions described in the present application.

Although the present application has been described with reference to some embodiments, various improvements may be made and components therein may be replaced with equivalents without departing from the scope of the present application. Especially, as long as there is no structural conflict, the various technical features mentioned in each embodiment can be combined in any way. The present application is not limited to the specific embodiments disclosed herein, but rather includes all technical solutions falling within the scope of the claims.

What is claimed is:

1. A welding detection apparatus for detecting a weld seam between a case and a top cover of a battery, the detection apparatus comprising:

an image acquisition component configured to shoot the weld seam, the image acquisition component being located obliquely above an outer side of the weld seam and forming an included angle with a height direction of the battery; and a processor configured to obtain a protruding height of the weld seam relative to a reference surface area on an outer side wall of the case according to a first distance between the image acquisition component and the outer side wall of the case, a second distance between the image acquisition component and the weld seam, and the included angle, and compare the protruding height with a preset height threshold to determine whether the protruding height of the weld seam is qualified; and configured to establish at least one plane parallel to the outer side wall of the case in an image to intersect with the weld seam to obtain an intersecting line which is a contour line of a surface of the weld seam, perform linear fitting on at least three points on the intersecting line to obtain a spatial straight line, calculate a distance between each of the at least three points and the spatial straight line, and compare the distance with a preset distance threshold to determine whether an appearance defect exists in the weld seam.

2. The welding detection apparatus according to claim 1, wherein the image acquisition component is a first image acquisition component located on one of two sides of the battery along a width direction, the welding detection apparatus further comprising:

a second image acquisition component located on another one of the two sides of the battery along the width direction, wherein the first image acquisition component and the second image acquisition component are configured to move along a length direction of the battery relative to the weld seam in a detection process.

3. The welding detection apparatus according to claim 1, wherein the processor is further configured to:

determine that the protruding height of the weld seam is unqualified in a case that a plurality of positions with the protruding height exceeding the preset height threshold exist on the weld seam within a first preset distance range in an extension direction of the weld seam and a number exceeds a preset value.

4. The welding detection apparatus according to claim 1, wherein the processor is further configured to select a maximum value of the protruding height of the weld seam in the height direction at a same position in an extension direction of the weld seam.

5. The welding detection apparatus according to claim 1, wherein the reference surface area is preset to be spaced apart from the weld seam in the height direction.

6. The welding detection apparatus according to claim 1, wherein the processor is further configured to:

divide the weld seam into a plurality of detection areas in an extension direction of the weld seam;

determine a sub-reference surface area corresponding to each of the plurality of detection areas on an outer surface of the case; and when obtaining the protruding height of the weld seam in each of the plurality of detection areas, use the determined sub-reference surface area corresponding to the each of the plurality of detection areas for calculation.

7. The welding detection apparatus according to claim 1, wherein the processor is further configured to:

determine that the appearance defect exists in the weld seam in a case that points with the distance exceeding the preset distance threshold consecutively exist on the weld seam within a second preset distance range in an extension direction of the weld seam.

8. The welding detection apparatus according to claim 1, wherein the processor is further configured to determine a type of the appearance defect in the weld seam according to a deviation direction and positions of the points with the distance exceeding the preset distance threshold relative to the straight spatial line in a case that the appearance defect exists in the weld seam.

9. A welding detection method, performed by the welding detection apparatus according to claim 1, for detecting a weld seam between a case and a top cover of a battery, comprising:

obtaining a protruding height of the weld seam relative to a reference surface area on an outer side wall of the case according to a first distance between an image acquisition component and the outer side wall of the case, a second distance between the image acquisition component and the weld seam, and an included angle, wherein the image acquisition component is configured to shoot the weld seam, and the image acquisition component is located obliquely above an outer side of the weld seam and forms the included angle with a height direction of the battery;

comparing the protruding height with a preset height threshold to determine whether the protruding height of the weld seam is qualified;

establishing at least one plane parallel to the outer side wall of the case in an image to intersect with the weld seam to obtain an intersecting line which is a contour line of a surface of the weld seam;

performing linear fitting on at least three points on the intersecting line to obtain a spatial straight line, and calculating a distance between each of the at least three points and the spatial straight line; and comparing the distance with a preset distance threshold to determine whether an appearance defect exists in the weld seam.

10. The welding detection method according to claim 9, wherein comparing the protruding height with the preset height threshold to determine whether the protruding height of the weld seam is qualified comprises:

determining that the protruding height of the weld seam is unqualified in a case that points with the protruding height exceeding the preset height threshold consecutively exist on the weld seam within a first preset distance range in an extension direction of the weld seam.

11. The welding detection method according to claim 9, wherein a maximum value of the protruding height of the weld seam in the height direction is selected at a same position in an extension direction of the weld seam.

12. The welding detection method according to claim 9, wherein the reference surface area is preset to be spaced apart from the weld seam in the height direction.

13. The welding detection method according to claim 9, further comprising:

dividing the weld seam into a plurality of detection areas in an extension direction of the weld seam;

determining a sub-reference surface area corresponding to each of the plurality of detection areas on an outer surface of the case, the reference surface area comprising a plurality of sub-reference surface areas; and when obtaining the protruding height of the weld seam in each of the plurality of detection areas, using the determined sub-reference surface area corresponding to the each of the plurality of detection areas for calculation.

14. The welding detection method according to claim 9, wherein comparing the distance with the preset distance threshold to determine whether the appearance defect exists in the weld seam comprises:

determining that the appearance defect exists in the weld seam in a case that points with the distance exceeding the preset distance threshold consecutively exist on the weld seam within a second preset distance range in an extension direction of the weld seam.

15. The welding detection method according to claim 9, wherein the weld seam appearance defect detection step further comprises:

determining a type of the appearance defect in the weld seam according to a deviation direction and positions of the points with the distance exceeding the preset distance threshold relative to the spatial straight line in a case that the appearance defect exists in the weld seam.

\* \* \* \* \*